United States Patent
Yoshinaka

(10) Patent No.: US 7,438,102 B2
(45) Date of Patent: Oct. 21, 2008

(54) PNEUMATIC TIRE WITH SPECIFIED BEAD PORTION PROFILE

(75) Inventor: Nobuyoshi Yoshinaka, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 505 days.

(21) Appl. No.: 11/082,838

(22) Filed: Mar. 18, 2005

(65) Prior Publication Data

US 2005/0211359 A1    Sep. 29, 2005

(30) Foreign Application Priority Data

Mar. 23, 2004    (JP)    ............... 2004-085229

(51) Int. Cl.
*B60C 3/00* (2006.01)
*B60C 15/00* (2006.01)
*B60C 15/02* (2006.01)
*B60C 15/024* (2006.01)

(52) U.S. Cl. .............. 152/454; 152/539; 152/644

(58) Field of Classification Search ............... 152/454, 152/539, 544
See application file for complete search history.

(56) References Cited

U.S. PATENT DOCUMENTS

| | | | |
|---|---|---|---|
| 532,950 A * | 1/1895 | Erickson | ............... 152/544 X |
| 575,783 A * | 1/1897 | Quimby | ............... 152/544 X |
| 2,933,118 A * | 4/1960 | Waber | ............... 152/544 |

FOREIGN PATENT DOCUMENTS

| | | |
|---|---|---|
| EP | 0 358 491 A2 | 3/1990 |
| EP | 1 361 076 A1 | 11/2003 |
| EP | 1 470 938 A1 | 10/2004 |
| JP | 2001-146105 A | 5/2001 |

* cited by examiner

*Primary Examiner*—Adrienne C Johnstone
(74) *Attorney, Agent, or Firm*—Birch, Stewart, Kolasch & Birch, LLP

(57) ABSTRACT

A bead portion 4 of a pneumatic tire 1 includes a vertical rising surface portion Sw1 which is connected to a bead base surface Sb through an arc bead heel surface Sh, and a straight or convex arc flange receiving surface portion Sw2 which is diagonally extending from the rising surface portion Sw1 radially outward and axially outward of the tire. In a normal internal pressure in which no load is applied, the flange receiving surface portion Sw2 is not in contact with a flange surface Rf, and in a load state in which 50% or more of normal load is applied, the flange receiving surface portion Sw2 comes into contact with the flange surface Rf.

5 Claims, 5 Drawing Sheets

Prior Art ated without deteriorating the riding comfort.

PNEUMATIC TIRE WITH SPECIFIED BEAD PORTION PROFILE

BACKGROUND OF THE INVENTION

1. Field of the Invention

The present invention relates to a pneumatic tire in which steering stability in a heavy load state applied such as at the time of high speed cornering is improved without deteriorating riding comfort.

2. Prior Art

In a conventional pneumatic tire, as schematically shown in FIG. 5, a profile shape of a bead portion a is formed to match a profile shape of an inner surface of a rim R. More specifically, an outer wall surface Sw of the bead portion a supported by a flange surface Rf of the rim R comprises a vertical rising surface portion s1 rising from a bead heel surface Sh, and a concave arc surface s2 extending from an outer end of the rising surface portion s1 in a form of concave arc. A radial height ja of the rising surface portions 1 from a bead baseline BL is substantially equal to a height jf of a vertical surface portion Rf1 in the flange surface Rf, and a radius of curvature ra of the concave arc surface s2 is set to a value as slightly large as about 115 to 120% of a radius of curvature rf of a curved surface portion Rf2 in the flange surface Rf.

In the case of a tire having such a bead profile shape, in a normal running state, the concave arc surface s2 and the curved surface portion Rf2 of the flange do not come into contact with each other almost at all. When they come into contact with each other in a heavy load state in which lateral G is applied strongly such as at the time of high speed cornering, its contact pressure is low, and its contact position is extremely low as low as near root of the curved surface portion Rf2 of the flange. That is, the binding force is not varied by the rim almost at all between the normal running state and the heavy load state. Thus, in the heavy load state, the cornering power becomes insufficient, and the steering stability can not be exhibited sufficiently.

An example of means for enhancing the cornering power is to enhance the rigidity of the bead portion itself by increasing the amount of bead apex rubber b shown in FIG. 5 and by providing a cord reinforcing layer c. However, this means has a problem that the vertical spring constant is increased and the riding comfort is deteriorated.

SUMMARY OF THE INVENTION

It is an object of the present invention to provide a pneumatic tire in which a rim binding force in a heavy load state is increased as compared with that in a normal running state to complement insufficiency of cornering power in the heavy load state, thereby enhancing the steering stability under a severe running condition such as high speed cornering without deteriorating the riding comfort.

To achieve the above object, an invention of claim 1 of this application provides a pneumatic tire comprising a bead portion having a bead base surface which sits on a rim base surface of a rim and a bead outer wall surface supported by a flange surface of the rim, wherein in a tire meridian cross section including a tire axis, the bead outer wall surface includes a rising surface portion which is connected to an outer end of the bead base surface in the axial direction of the tire through an arc bead heel surface and which rises radially outward, and a straight or convex arc flange receiving surface portion which diagonally extends from an outer end of the rising surface portion radially outward in the axial direction of the tire, in a normal internal pressure state having no load in which the tire is assembled to the rim and a normal internal pressure is charged into the tire, the flange receiving surface portion is not in contact with the flange surface, and in a state in which 50% or more load of a normal load is applied, the flange receiving surface portion first comes into contact with the flange surface.

In this specification, the term "normal internal pressure" means air pressure defined for each tire by a standard system including a standard on which tires are based, and means a maximum air pressure in JATMA, a maximum value described in Table "TIRE LOAD LIMITS AT VARIOUS COLD INFLATION PRESSURES" in TRA, and "INFLATION PRESSURE" in ETRTO, and is 180 kPa in the case of a passenger vehicle tire. The term "normal load" means a load under the normal internal pressure defined for each tire by the standard, and means a maximum load capacity in JATMA, a maximum value described in Table "TIRE LOAD LIMITS AT VARIOUS COLD INFLATION PRESSURES" in TRA, and "LOAD CAPACITY" in ETRTO.

According to the pneumatic tire of the present invention, in a load state, it is possible to bring the flange receiving surface portion of the bead portion into contact with the flange surface at a high contact position under high contact pressure. Therefore, it is possible to largely increase the rim binding force in the heavy load state as compared with that in the normal running state. As a result, it is possible to complement the insufficiency of the cornering power in the heavy load state, and to enhance the steering stability under a severe running condition such as high speed cornering without deterior-

DESCRIPTION OF THE PREFERRED EMBODIMENTS

An embodiment of the present invention will be explained together with illustrated examples.

Figure 1:
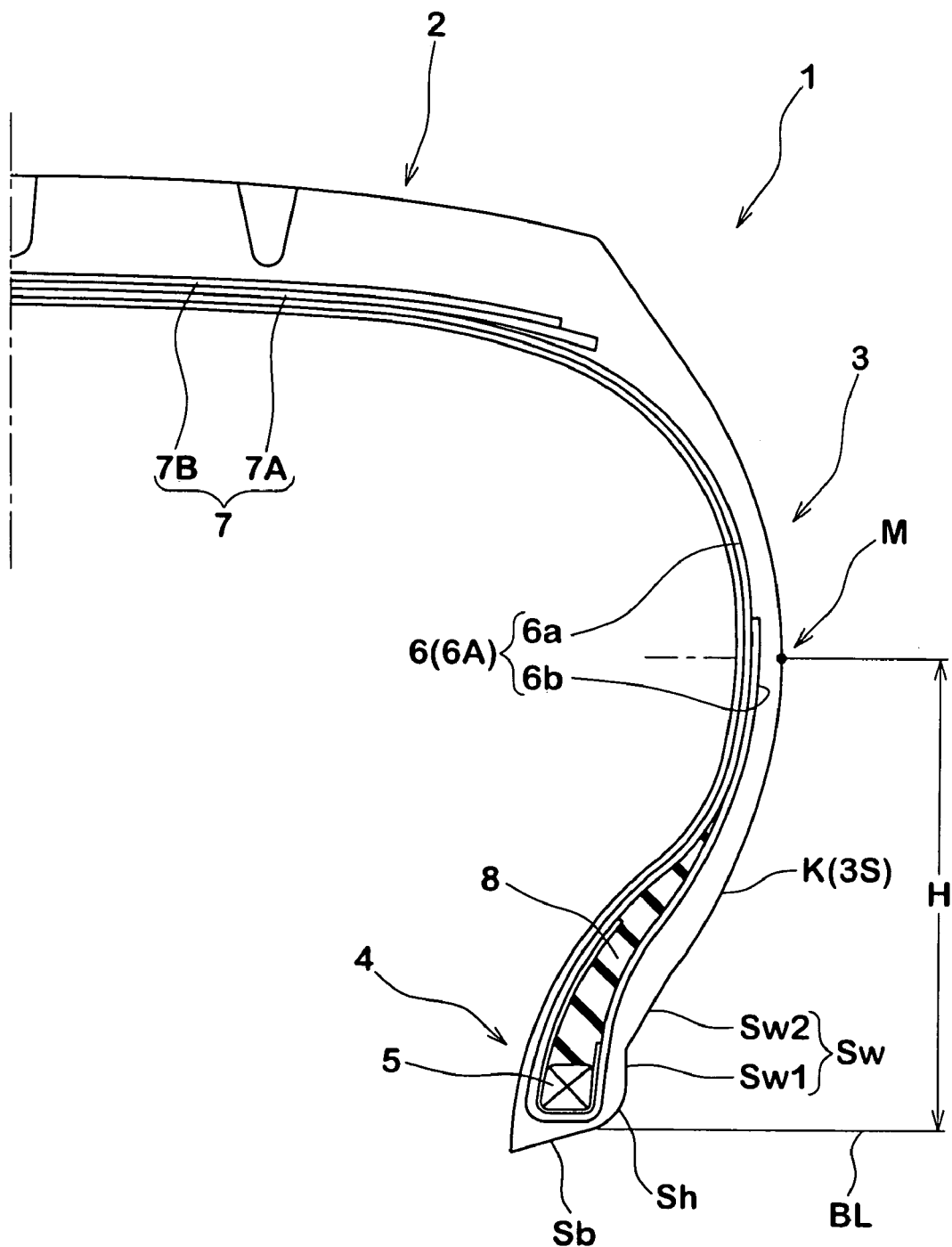
FIG. 1 is a sectional view showing an embodiment of a pneumatic tire of the present invention.
Figure 2:
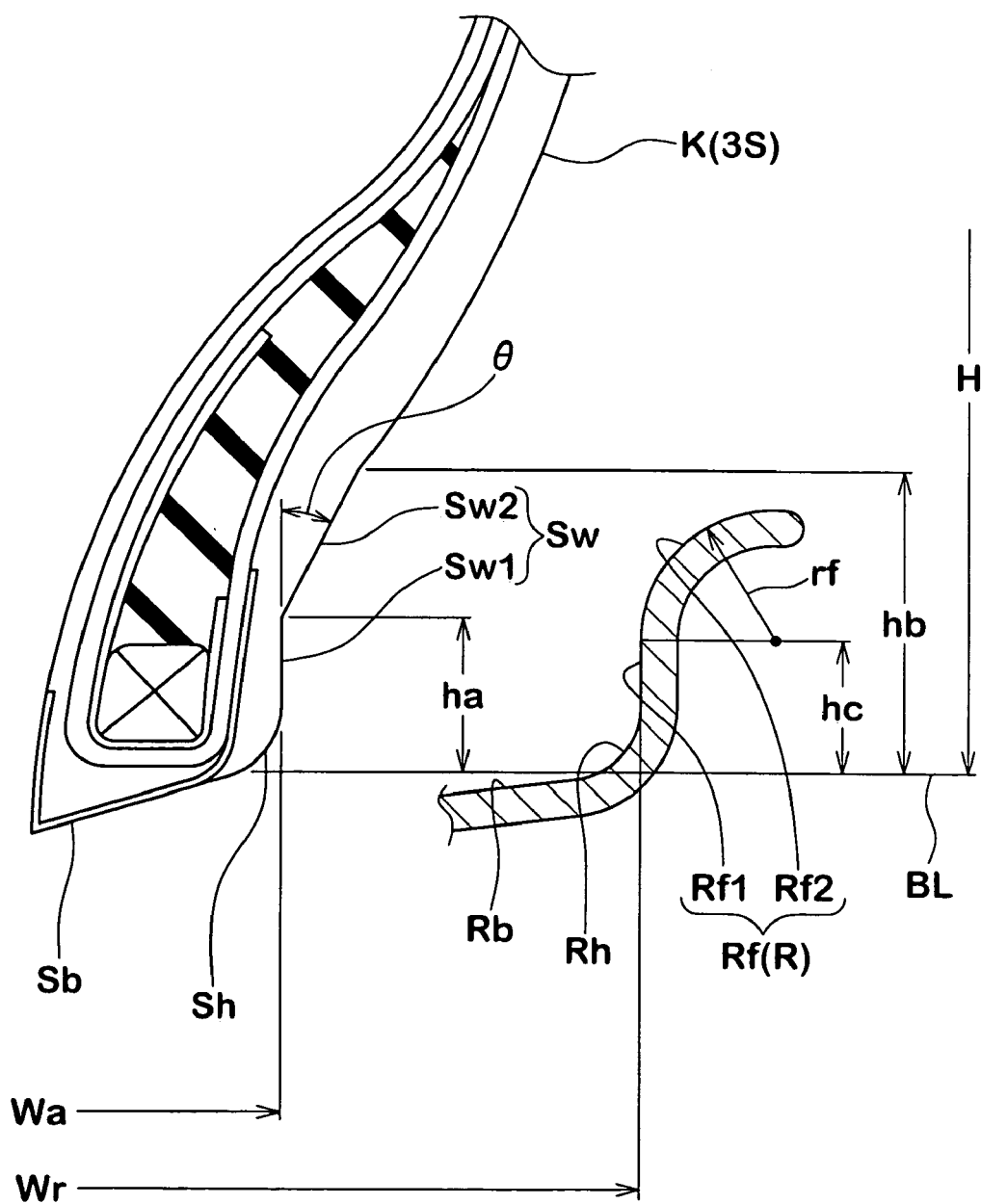
FIG. 2 is an enlarged sectional view of a bead portion of the pneumatic tire.

FIG. 1 is a sectional view when a pneumatic tire of the present invention is a passenger vehicle tire. FIG. 2 is an enlarged sectional view of a bead portion of the pneumatic tire. FIG. 3 is an enlarged sectional view of the bead portion in a state in which the tire is assembled to a rim.

In FIG. 1, a pneumatic tire 1 includes a carcass 6 which extends from a tread portion 2 to a bead core 5 of a bead portion 4 through a sidewall portion 3, and a belt layer 7 disposed on an inner side of the tread portion 2 and radially outside of the carcass 6.

The carcass 6 comprises one or more, in this example, one carcass ply 6A in which carcass cords are arranged at an angle of 75 to 90° with respect to a circumferential direction of the tire. Organic fiber cords such as nylon, rayon and polyester can preferably be employed as the carcass cords. The carcass ply 6A is continuously provided with a ply body portion 6a extending between the bead cores 5 and 5, and ply turnip portions 6b which are folded back from inside to outside around the bead cores 5 and 5 at both ends of the ply body portion 6a. A bead apex rubber 8 for reinforcing the bead is disposed between the ply body portion 6a and the ply turnip portion 6b.

The belt layer 7 comprises two or more, in this example, two belt plies 7A and 7B in which belt cords having high elasticity are arranged, for example, at an angle of 10 to 35° with respect to the circumferential direction of the tire. In the belt plies 7A and 7B, belt cords are intersecting between the plies to enhance the belt rigidity, and thereby strongly reinforcing substantially the entire width of the tread portion 2 with hoop effect. Steel cords, or organic fiber cords having high modulus such as aromatic polyamide fiber can suitably be used as the belt cords.

Next, as shown in FIG. 2, the bead portion 4 includes a bead base surface Sb which sits on a rim base surface Rb of a rim R, and a bead outer wall surface Sw which is connected to the bead base surface Sb through an arc bead heel surface Sh and which is supported by a flange surface Rf of the rim R.

As the rim R, it is possible to suitably employ a standard rim defined by the standard system including a standard on which tires are based, i.e., a standard rim in JATMA standard (Japan), a "Design Rim" in TRA standard (U.S.), and a "Measuring Rim" in ETRTO standard (Europe).

The rim R is of a known structure in which the flange surface Rf is connected to the rim base surface Rb through an arc rim heel surface Rh. The flange surface Rf comprises a vertical surface portion Rf1 which rises vertically from the rim heel surface Rh, and a convex arc curved surface portion Rf2 which is circumscribed with the vertical surface portion Rf1 and which is curved and extended radially outward and axially outward of the tire. In the case of a rim having a symbol "J" or "JJ" indicative of a flange shape generally used for a passenger vehicle tire, a height hc of the radially outer end of the vertical surface portion Rf1 from a bead base line BL is 8.0 mm in the case of "J", and 9.0 mm in the case of "JJ". A radius of curvature rf of the curved surface portion Rf2 is 9.5 mm in the case of "J" and 9.0 mm in the case of "JJ". The bead base line BL is a rim diameter position defined by the standard on which the tires are based, and this position means a position of φD in JATMA standard.

When the pneumatic tire 1 is held such that a bead width Wa matches with a rim width Wr in a state in which the tire is not assembled to the rim, in a meridian cross section of the tire including the axis of the tire, the bead outer wall surface SW includes a rising surface portion Sw1 vertically extending from the bead heel surface Sh radially outward, and a straight or convex arc flange receiving surface portion Sw2 diagonally extending from the outer end of the rising surface portion Sw1 radially outward and axially outward of the tire.

In this specification, the term "straight" includes a straight line, and a large convex or concave arc close to a straight line having a radius of curvature of 300 mm or greater, preferably 500 mm or greater and more preferably 800 mm or greater. The term "convex arc" means convex arc having a radius of curvature of less than 300 mm.

In this example, the flange receiving surface portion Sw2 is straight. Especially in this example, the flange receiving surface portion Sw2 has a center on the axial direction of the tire extending from a tire maximum-width position M, and is connected to a sidewall outer side surface 3S extending along a reference arc K passing through the tire maximum-width position M.

Figure 4A:
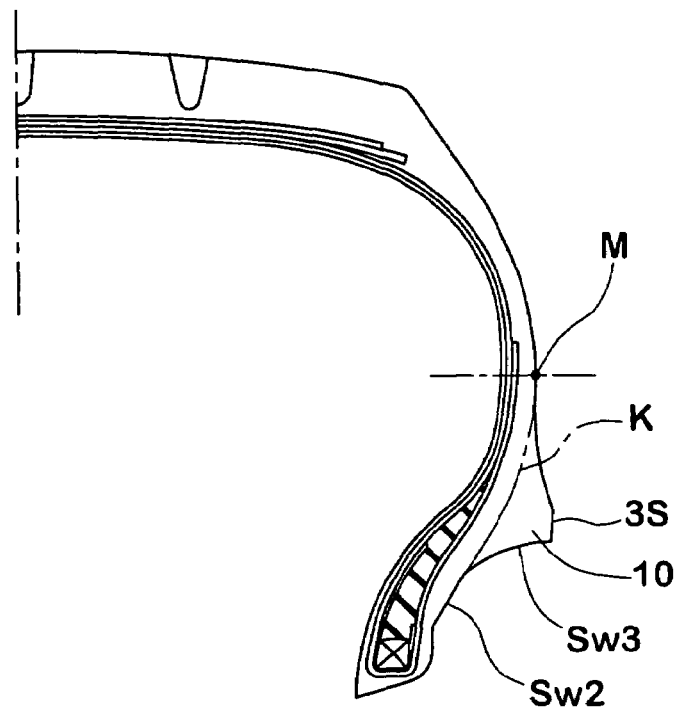
FIGS. 4(A) and 4(B) are sectional views showing a flange receiving surface portion when a sidewall portion is provided with a rim protector.
Figure 4B:
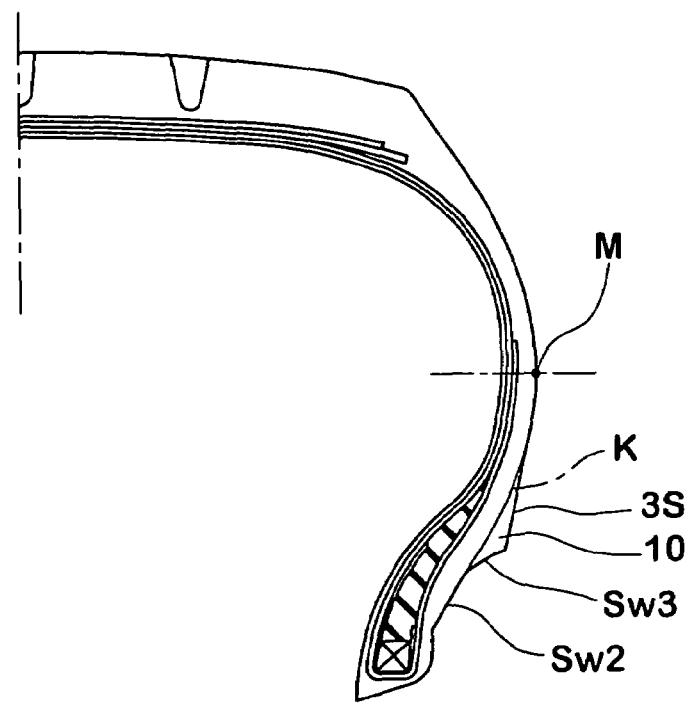
Figure 5:
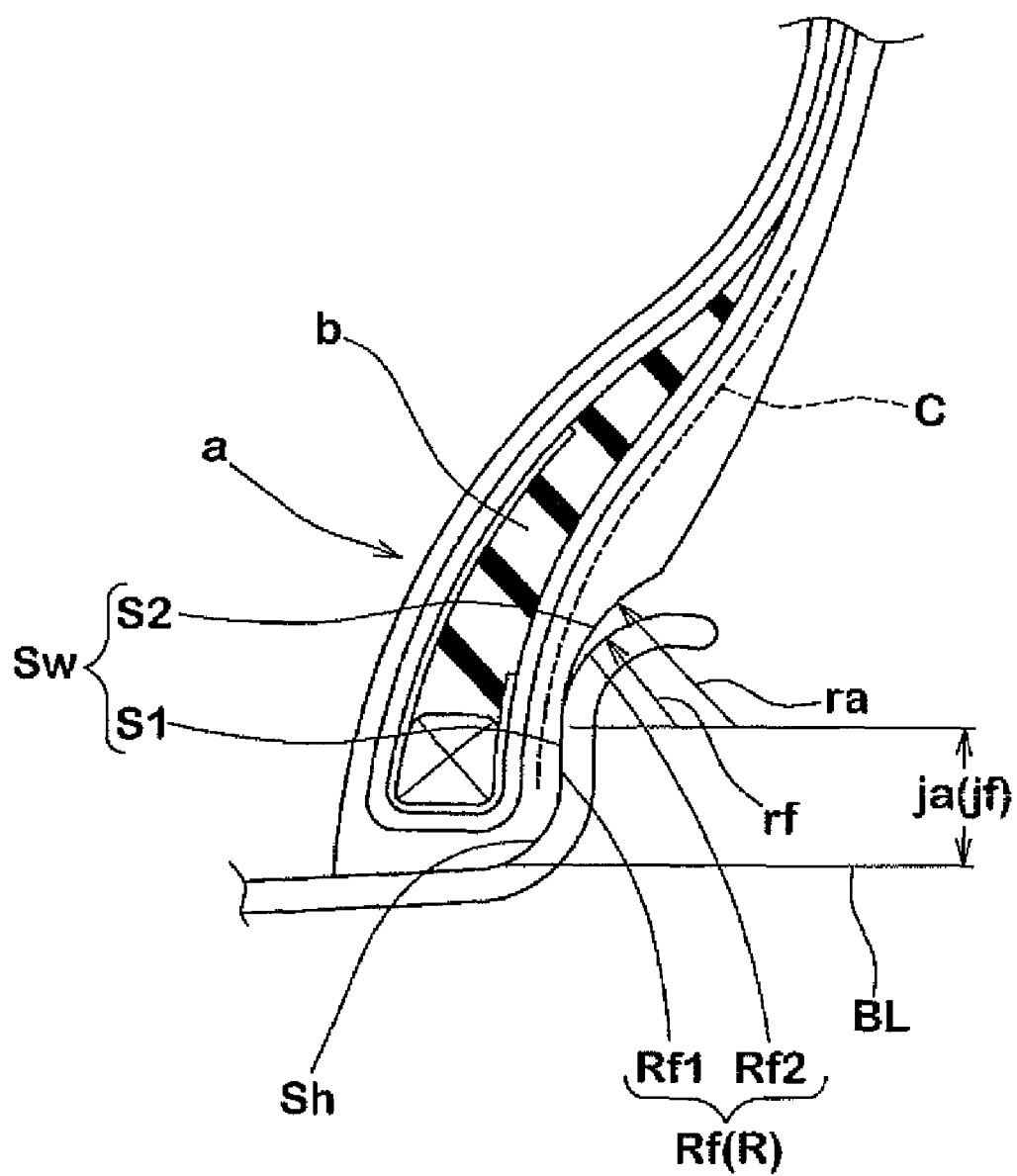
FIG. 5 is a sectional view for explaining a bead portion of a conventional tire.

As shown in FIGS. 4(A) and (B), the sidewall portion 3 may be provided with a rim protector 10 radially inside of the tire maximum-width position M. The rim protector 10 projects from the reference arc K axially outward of the tire, and has substantially triangular or trapezoidal cross section. In this case, the flange receiving surface portion Sw2 is connected to a sidewall outer side surface 3S through a concave arc connection surface Sw3. The tire maximum-width position M generally means a position where the sidewall outer side surface 3S most projects axially outward of the tire. When there exists the rim protector 10, however, a top of the rim protector 10 most projects axially outward of the tire in some cases. There upon, in this application, the "tire maximum-width position M" is defined as a position where the axial direction line of the tire passing through a point where the ply body portion 6a of the carcass most projects axially outward of the tire intersects with the sidewall outer side surface 3S.

Figure 3A:
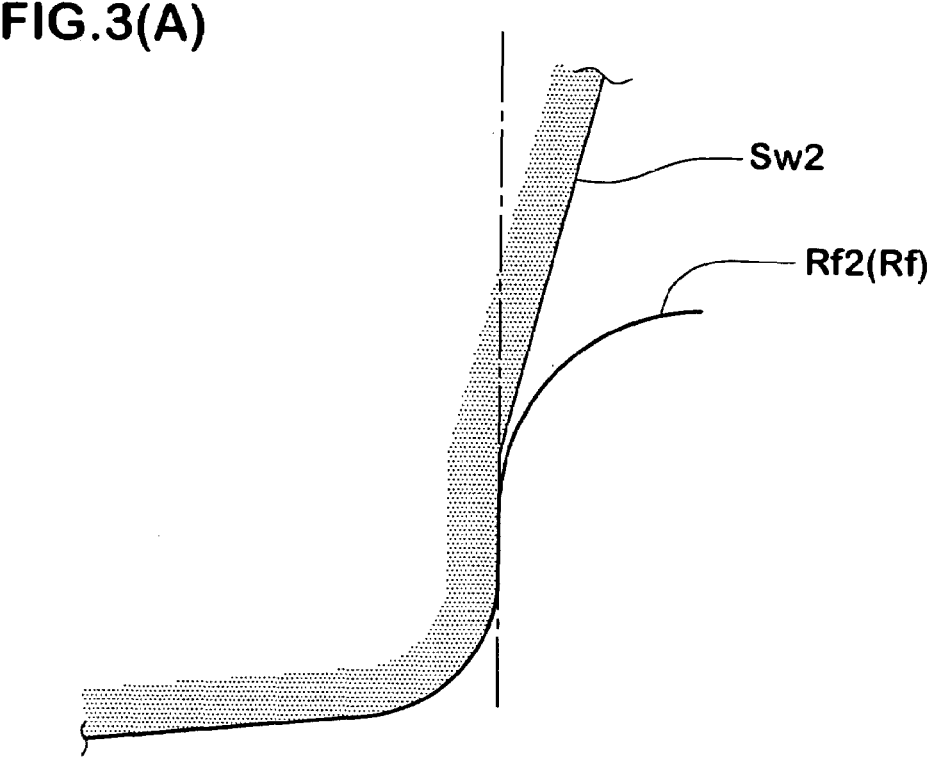
FIG. 3(A) is a diagram showing the bead portion in a normal internal pressure having no load.
Figure 3B:
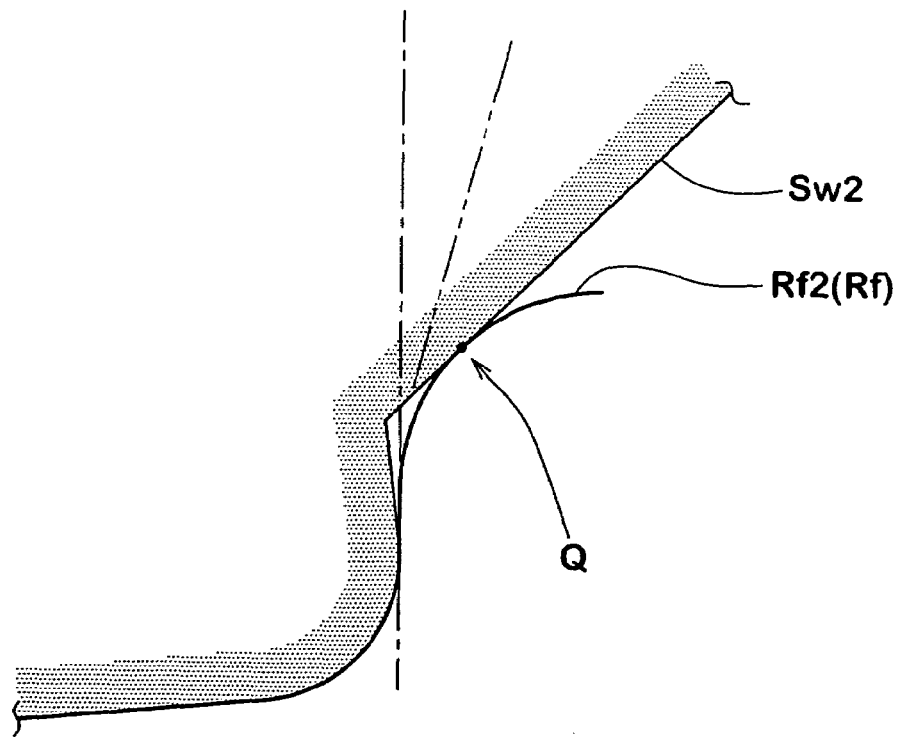
FIG. 3(B) is a diagram showing the bead portion in a load state.

In this invention, in the tire 1 having such a flange receiving surface portion Sw2, it is necessary that (1) in a normal internal pressure state having no load in which the tire is assembled to the rim R and a normal internal pressure is charged into the tire (shown in FIG. 3(A)), the flange receiving surface portion Sw2 is not in contact with the curved surface portion Rf2 of the flange surface Rf; and (2) in a load state in which 50% or more of the normal load is applied (shown in FIG. 3(B)), the flange receiving surface portion Sw2 first comes into contact with the curved surface portion Rf2 of the flange surface Rf.

In the load state, if the flange receiving surface portion Sw2 comes into contact with the flange surface Rf, the binding force of the rim R with respect to the bead-portion 4 is enhanced, and high cornering power can be exhibited. Especially since the flange receiving surface portion Sw2 is of straight or convex arc shape, a contact position Q with respect to the flange surface Rf can be shifted radially outward as compared with a contact position of the conventional tire, and its contact pressure can be increased. As a result, deflection and deformation caused form the bead portion 4 toward the sidewall portion 3 when a high load is applied can be reduced. Further, since the bead base surface Sb is strongly pushed against the rim base surface Rb, motion of the bead portion 4 can be bound more strongly, the rigidity feeling of the tire can be enhanced, and cornering power can be exhibited. Since the flange receiving surface portion Sw2 first comes into contact with the flange surface Rf in the severe high load condition where 50% or more of normal load is applied, the steering stability can largely be enhanced in a limited region during cornering such as circuit.

If the flange receiving surface portion Sw2 comes into contact with the flange surface Rf in a normal running state in a built-up area, the rigidity feeling and cornering power become excessively large, the riding comfort, straight stability and steering performance are adversely affected. Thus, it is preferable that they first come into contact with each other in the severe running state. More specifically, it is preferable that they first come into contact in the load state where 80% or more, more preferably 100% or more of the normal load is applied. Especially in the case of a tire for a sports car used in the severe region such as high speed cornering, it is preferable that the flange receiving surface portion Sw2 first comes into contact with the flange surface Rf when 120% or more of the normal load is applied. In order to enhance the steering stability in this application, it is preferable that they are in contact in the load state where 160% or less, 150% or less and more preferably 140% or less of the normal load is applied.

For this purpose, as shown in FIG. 2, it is necessary that the height ha of the radially inner end of the flange receiving surface portion Sw2 from the bead base line BL is greater than the height hc of the vertical surface portion Rf1 of the flange. Preferably, the height ha is in a range of 1.0 time to 1.5 times the height hc. If the tire is for a passenger vehicle and the symbol indicative of the flange shape is "J" and "JJ", it is preferable that the height ha is set in a range of 9.0 to 12.0 mm. At that time, it is preferable that the inclination angle θ of the flange receiving surface portion Sw2 with respect to the radial direction is in a range of 5 to 20°. It is preferable that the height hb of the radially outer end of the flange receiving surface portion Sw2 from the bead base line BL is in a range of 0.35 to 0.60 times the height H of the tire maximum-width position M from the bead base line BL.

If the height ha is less than 9.0 mm, it becomes difficult to set the contact-starting load to more than 50% of the normal load. If the height ha exceeds 12.0 mm, the contact-starting load becomes too high or contact can not be caused, and the region where the steering stability enhancing effect of this application is exhibited is eliminated almost at all. If the inclination angle θ is less than 5°, it becomes difficult to sufficiently increase the contact pressure with respect to the flange surface Rf, and since the contact position becomes low, the steering stability enhancing effect is deteriorated. If the inclination angle θ exceeds 20°, the sitting becomes unstable, and bear is generated during the tire producing process, which cause problems When the flange receiving surface portion Sw2 is of convex arc shape, the inclination angle θ is set to an angle formed between the radial direction and a straight line passing through radially inner end and outer end of the flange receiving surface portion Sw2.

If the height hb is less than 0.35 times the height H, the region of the flange receiving surface portion Sw2 becomes excessively small, and the flange receiving surface portion Sw2 adversely comes into contact with the flange surface Rf on an outer side surface than the flange receiving surface portion Sw2 in some cases depending upon the running state. If the height hb exceeds 0.60 times, a gage pressure of the clinch portion is reduced, bear is caused at the time of molding, and carcass line is prone to be deformed.

Even when the flange receiving surface portion Sw2 is curved in the form of convex arc also, substantially the same effect as that when the flange receiving surface portion Sw2 is straight can be exhibited.

Although especially preferred embodiment of the present invention has been described in detail, the invention is not limited to the illustrated examples, and can variously be deformed.

EXAMPLES

Tires for passenger vehicle having the structure shown in FIG. 1 and tire size of 215/40R17 were prototyped based on the specification shown in Table 1. The steering stability and riding comfort of the prototyped tires were measured and compared with each other. The specifications other than those shown in Table 1 are the same. The rims used here were standard rims (17×7.5JJ) of JATMA standard, the height hc of the vertical surface portion Rf1 in the flange surface Rf is 9.0 mm, the radius of curvature of the curved surface portion Rf2 is 9.0 mm.

(1) Steering Stability and Riding Comfort;

The prototyped tires were mounted to four wheels of a vehicle (2000 cc, FR vehicle) having rims (17×7.5JJ) with internal pressure of 230 kPa, and the vehicle was allowed to run on an ordinary road and a circuit course having dry asphalt road surface. The steering stability (cornering performance on the ordinary road, cornering performance on the circuit course, lane-changing feeling at high speed, and straight running performance), and the riding comfort (riding comfort on the ordinary road) were evaluated on a scale from 1 to 10 while a point of the conventional example is defined as 6, by means of a driver's sensory. The greater the value, more excellent the result is.

(2) Presence or Absence of Contact in Load State;

To the prototyped tires, 0%, 50% (2.01 kN), 80% (3.22 kN), 100% (4.02 kN), 120% (4.82 kN), 150% (6.03 kN), 160% (6.43 kN) of normal load (410 kgf=4.02 kN) were applied under conditions of rim (17×7.5JJ) and normal internal pressure (180 kPa), and presence and absence of contact between the flange receiving surface portion and the flange surface were checked.

TABLE 1

| | Conventional Example | Example 1 | Example 2 | Example 3 | Example 4 | Example 5 | Example 6 |
|---|---|---|---|---|---|---|---|
| Bead portion | | | | | | | |
| Flange receiving surface portion | Concave arc (R10.5) | Straight | Straight | Straight | Straight | Straight | Straight |
| Inclination angle θ (°) | | 15 | 15 | 15 | 15 | 15 | 15 |
| Height ha (mm) | 9 | 9.5 | 10 | 10.5 | 11.0 | 12.0 | 13.0 |
| Height hb (mm) | | 21 | 21 | 21 | 21 | 21 | 21 |
| (Ratio hb/H) <%> | | 49 | 49 | 49 | 49 | 49 | 49 |
| Presence or absence of contact in load state (@180 kPa) | | | | | | | |
| 0% load | Absence | Absence | Absence | Absence | Absence | Absence | Absence |
| 50% load | Absence | Presence | Absence | Absence | Absence | Absence | Absence |
| 80% load | Absence | Presence | Presence | Absence | Absence | Absence | Absence |
| 100% load | Absence | Presence | Presence | Presence | Absence | Absence | Absence |
| 120% load | Absence | Presence | Presence | Presence | Presence | Absence | Absence |
| 150% load | Absence | Presence | Presence | Presence | Presence | Presence | Absence |

TABLE 1-continued

| | | | | | | | |
|---|---|---|---|---|---|---|---|
| 160% load | Absence | Presence | Presence | Presence | Presence | Presence | Presence |
| Steering stability | | | | | | | |
| Cornering performance on ordinary road | 6 | 6 | 6 | 6 | 6 | 6 | 6 |
| Cornering performance on circuit course | 6 | 6 | 7 | 7.5 | 8 | 8 | 8 |
| Lane-changing feeling at high speed | 6 | 6.5 | 6.5 | 7 | 7 | 6.5 | 6 |
| Straight running performance | 6 | 6 | 6 | 6 | 6 | 6 | 6 |
| Riding comfort (ordinary road) | 6 | 6 | 6 | 6 | 6 | 6 | 6 |

| | Example 7 | Example 8 | Example 9 | Example 10 | Example 11 | Example 12 |
|---|---|---|---|---|---|---|
| Bead portion | | | | | | |
| Flange receiving surface portion | Straight | Straight | Straight | Straight | Straight | Concave arc (R300) |
| Inclination angle θ (°) | 5 | 20 | 30 | 15 | 15 | 15 *1 |
| Height ha (mm) | 11.0 | 11.0 | 11.0 | 11.0 | 11.0 | 10.5 |
| Height hb (mm) | 21 | 21 | 21 | 25 | 30 | 21 |
| (Ratio hb/H) <%> | 49 | 49 | 49 | 58 | 70 | 49 |
| Presence or absence of contact in load state (@180 kPa) | | | | | | |
| 0% load | Absence | Absence | Presence | Absence | Absence | Absence |
| 50% load | Absence | Absence | Presence | Absence | Absence | Absence |
| 80% load | Absence | Presence | Presence | Absence | Absence | Presence |
| 100% load | Absence | Presence | Presence | Absence | Absence | Presence |
| 120% load | Absence | Presence | Presence | Presence | Presence | Presence |
| 150% load | Presence | Presence | Presence | Presence | Presence | Presence |
| 160% load | Presence | Presence | Presence | Presence | Presence | Presence |
| Steering stability | | | | | | |
| Cornering performance on ordinary road | 6 | 6 | 6 | 6 | 6 | 6 |
| Cornering performance on circuit course | 7.5 | 8 | 8 | 8 | 8 | 8 |
| Lane-changing feeling at high speed | 7 | 7 | 7 | 7 | 7 | 7 |
| Straight running performance | 6 | 6 | 5 | 6 | 6 | 6 |
| Riding comfort (ordinary road) | 6 | 6 | 6 | 6 | 6 | 6 |

*1 The inclination angle θ is an angle formed between the radial direction and a straight line passing through radially inner end and outer end of the flange receiving surface portion.

As a result of the test, as compared with the conventional example, it can be confirmed that according to the tires of the examples of the present invention, the riding comfort and cornering performance on the ordinary road can be maintained, the steering stability in the severe running state such as cornering performance and high speed lane-changing feeling on the circuit course can be enhanced.

What is claimed is:

1. A pneumatic tire comprising a bead portion having a bead base surface which sits on a rim base surface of a rim and a bead outer wall surface supported by a flange surface of the rim, wherein in a tire meridian cross section including a tire axis, the bead outer wall surface includes a rising surface portion which is connected to an outer end of the bead base surface in the axial direction of the tire through an arc bead heel surface and which rises radially outward, and a flange receiving surface portion which diagonally extends from an outer end of the rising surface portion radially outward in the axial direction of the tire, said flange receiving surface portion having a contour of one of a straight line, a large outwardly convex arc close to a straight line having a radius of curvature of 300 mm or greater, a large inwardly concave arc close to a straight line having a a radius of curvature of 300 mm or greater, or an outwardly convex arc having a radius of curvature of less than 300 mm, in a normal internal pressure state having no load in which the tire is assembled to the rim and a normal internal pressure is charged into the tire, the flange receiving surface portion is not in contact with the flange surface, and in a state in which 50% or more load of a normal load is applied, the flange receiving surface portion first comes into contact with the flange surface.

2. The pneumatic tire according to claim 1, wherein a flange surface of the rim has a vertical surface portion which vertically rises from an arc rim heel surface, a height ha of a radially inner end of the flange receiving surface portion from a bead base line BL is in a range of 1.0 to 1.5 times a height hc of a radially outer end of the vertical surface portion from the bead base line BL.

3. The pneumatic tire according to claim 1 or 2, wherein a height ha of the radially inner end of the flange receiving surface portion from the bead base line is in a range of 9.0 to 12 mm, and an inclination angle θ of the flange receiving surface portion with respect to a radial line is in a range of 5 to 20 C.

4. The pneumatic tire according to claim 1, wherein a height hb of a radially outer end of the flange receiving surface portion from the bead base line is in a range of 0.35 to 0.60 times a height H of a tire maximum-width position from the bead base line.

5. The pneumatic tire according to claim 1, wherein the flange receiving surface portion first comes into contact with the flange surface in a state in which 80% or more of normal load is applied.

* * * * *